(No Model.)

A. GARTNER.
WIRE CONNECTOR.

No. 569,753. Patented Oct. 20, 1896.

WITNESSES:
Wm. D. Bell.
Felicie Gartner

INVENTOR:
Alfred Gartner
BY Gartner & Co
ATTORNEYS.

UNITED STATES PATENT OFFICE.

ALFRED GARTNER, OF NEWARK, NEW JERSEY, ASSIGNOR OF THREE-FOURTHS TO CHARLES H. McINTIRE, OF SAME PLACE.

WIRE-CONNECTOR.

SPECIFICATION forming part of Letters Patent No. 569,753, dated October 20, 1896.

Application filed June 17, 1896. Serial No. 595,886. (No model.)

*To all whom it may concern:*

Be it known that I, ALFRED GARTNER, a citizen of the United States, residing in Newark, county of Essex, and State of New Jersey, have invented certain new and useful Improvements in Wire-Connectors; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a connector for telegraph, telephone, and other electric wires of simple, strong, and durable construction, and which on account of the absence of any foreign material, such as solder or welding metals, is of uniform conductivity and does not increase or reduce the resistance when formed into a joint with the inserted wires.

The invention consists in the improved wire-connector, formed by two tubes of different diameter and arranged one within the other and in such close proximity to each other as to form one substantially solid tube, and in the combination and arrangement of the various parts thereof, substantially as will be hereinafter more fully described, and finally embodied in the clauses of the claim.

Figure 1:
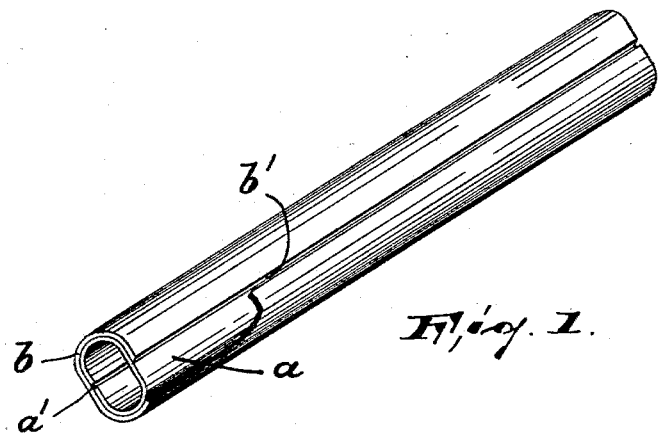
Figure 2:
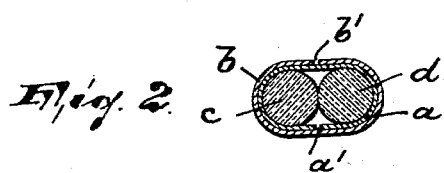
Figure 3:
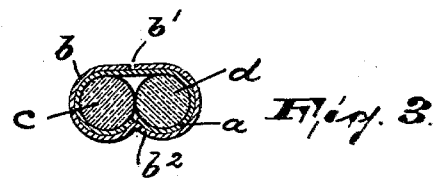
Figure 4:
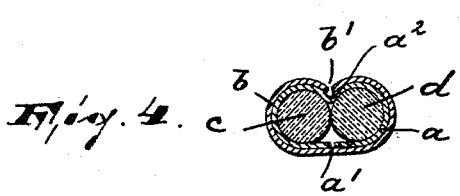
Figure 5:
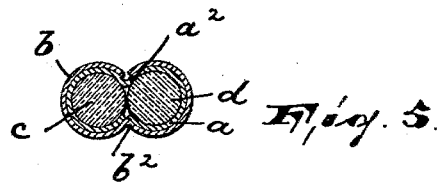

In the accompanying drawings, Figure 1 is a perspective view of my improved connector; Fig. 2, a cross-section through the same, the wires being inserted; Figs. 3, 4, and 5, views similar to Fig. 2, illustrating slight modifications thereof; and Fig. 6, a front elevation of the joint when finished.

Figure 6:

In said drawings, $a$ represents an oval tube having its longer internal diameter about equal to the combined diameter of the wires to be inserted and its shorter internal diameter equal to the diameter of a single wire. Said tube, which is provided on one of its flattened sides with an elongated open slot $a'$, extending through its entire length, is arranged within the oval tube $b$, the internal caliber or bore of which is equal to and corresponds in shape with the outer circumference of the inner tube $a$, that is to say, the inner periphery of the tube $b$ is equal to the outer periphery of the tube $a$. The outer tube $b$ is also provided with an open elongated slot $b'$, extending through the entire length thereof and arranged diametrically opposite the open slot $a'$ of tube $a$. In other words, the edges forming the slot $b'$ are supported by the solid portion of the tube $a$, while the edges forming the slot $a'$ are supported by the solid portion of the tube $b$. The wires $c$ and $d$ are inserted from opposite directions into said connector and are twisted together with the same, substantially as shown in Fig. 6.

In the modifications as illustrated in Figs. 3 and 4 the outer (or inner) tube is provided with a depression $b^2$, (or $a^2$,) conforming in shape to the shape of the inserted wires, and thus increase the bearing-surface between the said wires and the connector even before being twisted. The edges forming the elongated slots conform to the shape of said depressions, as clearly shown.

In the modification Fig. 5 each of the tubes $a$ and $b$ is provided with a depression $a^2$ and $b^2$, respectively, and thus greatly increases the contact-surface between the connector and the inserted wires.

Heretofore joints have been made which consisted of an oval seamless tube, as in United States Letters Patent No. 451,933, or of an oval soldered or welded tube provided with a longitudinal extending depression, as in United States Letters Patent No. 557,690. Both of said joints are objectionable, not only on account of the great expense of manufacture, but also that a foreign substance, such as solder or welding compound, is introduced, whereby the resistance in the joint is either increased or decreased.

My present joint overcomes said objections. It is easily and cheaply manufactured, yet strong and durable, and contains no foreign substance.

I do not intend to limit myself to the precise construction shown and described, as various alterations can be made without changing the scope of my invention; but

What I claim as new, and desire to secure by Letters Patent, is—

1. A wire-connector consisting of two tubes arranged one within the other and in close proximity to each other, and adapted to receive the wires to be jointed and to be twisted together with the said wires, substantially as described.

2. A wire-connector consisting of two oval tubes arranged one within the other and in close proximity to each other, the internal longer diameter of the inner tube being equal to the combined diameter of the wires to be jointed, while its internal shorter diameter is equal to the diameter of a single wire, said connector being adapted to receive the wires and to be twisted together with the said wires, substantially as described.

3. A wire-connector consisting of two tubes arranged one within the other and in close proximity to each other, each of said tubes being provided with an elongated open slot extending through the entire length of its respective tube, said connector being adapted to receive the wires and to be twisted together with the said wires, substantially as described.

4. A wire-connector consisting of two tubes arranged one within the other and in close proximity to each other, each of said tubes being provided with an elongated open slot extending through its entire length and arranged diametrically opposite each other, a longitudinally-extending depression arranged in one of said tubes and conforming in shape to the shape of the inserted wires, said connector being adapted to receive the wires to be jointed and to be twisted together with the said wires, substantially as described.

5. A wire-connector consisting of two tubes arranged one within the other and in close proximity to each other and provided with a longitudinally-extending depression, said connector being adapted to receive the wires and to be twisted together with said wires, substantially as described.

6. A wire-connector consisting of two tubes arranged one within the other and in close proximity to each other, each of said tubes being provided with an elongated open slot and with a depression arranged diametrically opposite the slot, the depression in one tube conforming to the shape of the edges forming the slot in the other tube, said connector being adapted to receive the wires and to be twisted together with the said wires, substantially as described.

In testimony that I claim the foregoing I have hereunto set my hand this 16th day of June, 1896.

ALFRED GARTNER.

Witnesses:
WM. D. BELL,
DUNCAN M. ROBERTSON.